(12) United States Patent
Thome et al.

(10) Patent No.: US 10,898,301 B2
(45) Date of Patent: Jan. 26, 2021

(54) PROSTHETIC ASSEMBLY AND METHOD FOR PRODUCING THE SAME

(71) Applicant: JJGC INDUSTRIA E COMERCIO DE MATERIAIS DENTARIOS S.A., Curitiba (BR)

(72) Inventors: Geninho Thome, Curitiba (BR); Felix Andreas Mertin, Curitiba (BR); Ivanio Pereira Da Silva, Curitiba (BR); Rafael Calixto Salatti, Curitiba (BR)

(73) Assignee: JJGC INDUSTRIA E COMERCIO DE MATERIAIS DENTARIOS S.A., Curitiba (BR)

( * ) Notice: Subject to any disclaimer, the term of this patent is extended or adjusted under 35 U.S.C. 154(b) by 93 days.

(21) Appl. No.: 16/097,830

(22) PCT Filed: Apr. 28, 2017

(86) PCT No.: PCT/BR2017/050101
§ 371 (c)(1),
(2) Date: Oct. 30, 2018

(87) PCT Pub. No.: WO2017/190207
PCT Pub. Date: Nov. 9, 2017

(65) Prior Publication Data
US 2019/0133719 A1 May 9, 2019

(30) Foreign Application Priority Data
May 5, 2016 (BR) .............................. 102016010184

(51) Int. Cl.
*A61C 8/00* (2006.01)
(52) U.S. Cl.
CPC ............ *A61C 8/0022* (2013.01); *A61C 8/006* (2013.01); *A61C 8/0037* (2013.01);
(Continued)

(58) Field of Classification Search
CPC ... A61C 8/0022; A61C 8/0037; A61C 8/0065; A61C 8/0068; A61C 8/0069; A61C 8/0071
See application file for complete search history.

(56) References Cited

U.S. PATENT DOCUMENTS 422,307 A    2/1890  Libbey
1,698,951 A  1/1929  Holmes
(Continued)

FOREIGN PATENT DOCUMENTS

BR  MU8801488 U2  11/2009
BR  MU8800606 U2   4/2010
(Continued)

OTHER PUBLICATIONS

ADIN Dental Implant Systems, Tourag (TM)-S, Website Catalog, 2 pages, Sep. 14, 2014.
(Continued)

*Primary Examiner* — Ralph A Lewis
(74) *Attorney, Agent, or Firm* — Oliff PLC

(57) ABSTRACT

The present invention relates to a prosthetic assembly (1, 10, 100) comprising a prosthetic component (2, 20, 200) and a retention screw (6, 60, 600) with an interference geometry (5, 50, 500) designed to allow relative rotation, limit relative longitudinal motion and inseparably join the prosthetic component (2, 20, 200) and the retention screw (6, 60, 600). The interference geometry (5, 50, 500) can be in the form of a ring attached to the retention screw (6) in a portion of the body of this screw (6) having a smaller diameter, or in the form of one or more inwardly folded flaps integrated in the prosthetic component (20) and diametrically distributed around the base thereof, or in the form of a uniform, tapered and hollow projection of the lower portion of the prosthetic element (200). The invention further relates to a method for producing the disclosed prosthetic assembly (1, 10, 100),
(Continued)

including the following steps: forming a prosthetic component (2, 20, 200) having a central hole (8, 80) for receiving the retention screw (6, 60, 600), forming a retention screw (6, 60, 600), the body of which has a portion having a smaller diameter (62, 602), inserting the retention screw (6, 60, 600) into the central hole (8, 80) of the prosthetic component (2, 20, 200), and forming an interference geometry (5, 50, 500) between the base of the prosthetic component (2, 20, 200) and the body of the retention screw (6, 60, 600).

18 Claims, 6 Drawing Sheets

(52) U.S. Cl.
CPC .......... *A61C 8/0065* (2013.01); *A61C 8/0068* (2013.01); *A61C 8/0069* (2013.01); *A61C 8/0071* (2013.01); *A61C 8/0074* (2013.01); *A61C 8/0075* (2013.01)

(56) References Cited

U.S. PATENT DOCUMENTS

| | | | |
|---|---|---|---|
| 2,215,770 | A | 9/1940 | Sheffield |
| 2,788,046 | A | 4/1957 | Rosan |
| 3,293,663 | A | 12/1966 | Cronin |
| 3,481,380 | A | 12/1969 | Breed |
| 3,672,058 | A | 6/1972 | Nikoghossian |
| 3,797,113 | A | 3/1974 | Brainin |
| 3,849,887 | A | 11/1974 | Brainin |
| 4,103,422 | A | 8/1978 | Weiss et al. |
| 4,144,795 | A | 3/1979 | Gutshall |
| 4,293,302 | A | 10/1981 | Hassler et al. |
| 4,406,623 | A | 9/1983 | Grafelmann et al. |
| 4,431,416 | A | 2/1984 | Niznick |
| 4,468,200 | A | 8/1984 | Munch |
| 4,531,915 | A | 7/1985 | Tatum, Jr. |
| 4,547,157 | A | 10/1985 | Driskell |
| 4,645,453 | A | 2/1987 | Niznick |
| 4,713,003 | A | 12/1987 | Symington et al. |
| 4,723,913 | A | 2/1988 | Bergman |
| 4,738,623 | A | 4/1988 | Driskell |
| 4,740,208 | A | 4/1988 | Cavon |
| 4,758,161 | A | 7/1988 | Niznick |
| 4,826,434 | A | 5/1989 | Krueger |
| 4,863,383 | A | 9/1989 | Grafelmann |
| 4,865,603 | A | 9/1989 | Noiles |
| 4,927,363 | A | 5/1990 | Schneider |
| 4,932,868 | A | 6/1990 | Linkow et al. |
| 4,960,381 | A | 10/1990 | Niznick |
| 4,976,739 | A | 12/1990 | Duthie, Jr. |
| 5,000,686 | A | 3/1991 | Lazzara et al. |
| 5,002,488 | A | 3/1991 | Homsy |
| 5,007,835 | A | 4/1991 | Valen |
| 5,061,181 | A | 10/1991 | Niznick |
| 5,062,800 | A | 11/1991 | Niznick |
| 5,071,350 | A | 12/1991 | Niznick |
| 5,074,790 | A | 12/1991 | Bauer |
| 5,076,788 | A | 12/1991 | Niznick |
| RE33,796 | E | 1/1992 | Niznick |
| 5,078,607 | A | 1/1992 | Niznick |
| 5,087,201 | A | 2/1992 | Mondani et al. |
| 5,095,817 | A | 3/1992 | Takamura |
| 5,100,323 | A | 3/1992 | Friedman et al. |
| 5,116,225 | A | 5/1992 | Riera |
| 5,120,171 | A | 6/1992 | Lasner |
| 5,194,000 | A | 3/1993 | Dury |
| 5,195,892 | A | 3/1993 | Gersberg |
| 5,226,766 | A | 7/1993 | Lasner |
| 5,230,590 | A | 7/1993 | Bohannan et al. |
| 5,328,371 | A | 7/1994 | Hund et al. |
| 5,343,391 | A | 8/1994 | Mushabac |
| 5,427,527 | A | 6/1995 | Niznick et al. |
| 5,433,606 | A | 7/1995 | Niznick et al. |
| 5,435,723 | A | 7/1995 | O'Brien |
| 5,439,381 | A | 8/1995 | Cohen |
| 5,484,286 | A | 1/1996 | Hansson |
| 5,527,183 | A | 6/1996 | O'Brien |
| 5,571,017 | A | 11/1996 | Niznick |
| 5,580,246 | A | 12/1996 | Fried et al. |
| 5,584,629 | A | 12/1996 | Bailey et al. |
| 5,588,838 | A | 12/1996 | Hansson et al. |
| 5,593,410 | A | 1/1997 | Vrespa |
| D378,132 | S | 2/1997 | Strain |
| 5,601,429 | A | 2/1997 | Blacklock |
| 5,628,630 | A | 5/1997 | Misch et al. |
| 5,639,237 | A | 6/1997 | Fontenot |
| 5,642,996 | A | 7/1997 | Mochida et al. |
| 5,645,740 | A | 7/1997 | Naiman et al. |
| D382,962 | S | 8/1997 | Schaffner |
| D383,541 | S | 9/1997 | Strain |
| 5,674,072 | A | 10/1997 | Moser et al. |
| 5,695,335 | A | 12/1997 | Haas et al. |
| 5,702,445 | A | 12/1997 | Brånemark |
| 5,716,412 | A | 2/1998 | DeCarlo et al. |
| 5,725,375 | A | 3/1998 | Rogers |
| 5,727,943 | A | 3/1998 | Beaty et al. |
| 5,733,123 | A | 3/1998 | Blacklock et al. |
| 5,752,830 | A | 5/1998 | Suarez |
| 5,759,034 | A | 6/1998 | Daftary |
| 5,782,918 | A | 7/1998 | Klardie et al. |
| 5,795,160 | A | 8/1998 | Hahn et al. |
| 5,810,589 | A | 9/1998 | Michnick et al. |
| 5,810,590 | A | 9/1998 | Fried et al. |
| 5,816,812 | A | 10/1998 | Kownacki et al. |
| 5,820,374 | A | 10/1998 | Simmons et al. |
| 5,823,776 | A | 10/1998 | Duerr et al. |
| 5,823,777 | A | 10/1998 | Misch et al. |
| 5,858,079 | A | 1/1999 | Ohtsu et al. |
| 5,868,747 | A | 2/1999 | Ochoa et al. |
| 5,871,356 | A | 2/1999 | Guedj |
| 5,876,453 | A | 3/1999 | Beaty |
| 5,897,319 | A | 4/1999 | Wagner et al. |
| 5,904,483 | A * | 5/1999 | Wade .................. A61C 8/0048 433/173 |
| 5,915,968 | A | 6/1999 | Kirsch et al. |
| 5,931,675 | A | 8/1999 | Callan |
| 5,938,444 | A | 8/1999 | Hansson et al. |
| 5,947,733 | A * | 9/1999 | Sutter .................. A61C 8/005 433/173 |
| 5,954,504 | A | 9/1999 | Misch et al. |
| 5,964,768 | A | 10/1999 | Huebner |
| 5,967,783 | A | 10/1999 | Ura |
| 6,039,568 | A | 3/2000 | Hinds |
| 6,048,204 | A | 4/2000 | Klardie et al. |
| 6,068,479 | A | 5/2000 | Kwan |
| 6,116,904 | A | 9/2000 | Kirsch et al. |
| 6,129,730 | A | 10/2000 | Bono et al. |
| 6,135,772 | A | 10/2000 | Jones |
| 6,149,432 | A | 11/2000 | Shaw et al. |
| 6,168,633 | B1 | 1/2001 | Shoher et al. |
| 6,200,345 | B1 | 3/2001 | Morgan |
| 6,227,857 | B1 | 5/2001 | Morgan et al. |
| 6,227,859 | B1 * | 5/2001 | Sutter .................. A61C 8/005 433/173 |
| 6,273,722 | B1 | 8/2001 | Phillips |
| 6,283,752 | B1 * | 9/2001 | Kumar .................. A61C 8/0001 433/172 |
| 6,283,754 | B1 | 9/2001 | Wohrle |
| 6,287,117 | B1 | 9/2001 | Niznick |
| D450,123 | S | 11/2001 | Atkin et al. |
| 6,312,259 | B1 | 11/2001 | Kvarnstrom et al. |
| 6,315,564 | B1 | 11/2001 | Levisman |
| 6,364,663 | B1 | 4/2002 | Dinkelacker |
| 6,371,709 | B1 | 4/2002 | Papafotiou et al. |
| 6,394,806 | B1 | 5/2002 | Kumar |
| 6,398,786 | B1 | 6/2002 | Sesic |
| 6,402,515 | B1 | 6/2002 | Palti et al. |
| 6,419,491 | B1 | 7/2002 | Ricci et al. |
| 6,431,869 | B1 | 8/2002 | Reams et al. |
| 6,481,760 | B1 | 11/2002 | Noel et al. |

(56) References Cited

U.S. PATENT DOCUMENTS

| | | | |
|---|---|---|---|
| 6,482,076 B1 | 11/2002 | Straub et al. | |
| 6,527,554 B2 | 3/2003 | Hurson et al. | |
| 6,547,564 B1 | 4/2003 | Hansson | |
| 6,626,671 B2 | 9/2003 | Klardie et al. | |
| 6,648,643 B2 | 11/2003 | Hollander et al. | |
| 6,655,961 B2 | 12/2003 | Cottrell | |
| 6,655,962 B1 | 12/2003 | Kennard | |
| 6,663,388 B1 * | 12/2003 | Schar | A61C 8/005 |
| | | | 433/173 |
| 6,667,701 B1 | 12/2003 | Tao | |
| 6,726,481 B1 | 4/2004 | Zickmann et al. | |
| 6,726,689 B2 | 4/2004 | Jackson | |
| 6,733,291 B1 | 5/2004 | Hurson | |
| 6,733,503 B2 | 5/2004 | Layrolle et al. | |
| 6,769,913 B2 | 8/2004 | Hurson | |
| 6,840,769 B2 | 1/2005 | Augthun et al. | |
| 6,846,180 B1 | 1/2005 | Joos | |
| 6,887,077 B2 | 5/2005 | Porter et al. | |
| 6,896,517 B1 | 5/2005 | Bjorn et al. | |
| 6,913,465 B2 | 7/2005 | Howlett et al. | |
| 6,955,258 B2 | 10/2005 | Howlett et al. | |
| 6,981,873 B2 | 1/2006 | Choi et al. | |
| 6,997,711 B2 | 2/2006 | Miller | |
| 7,008,227 B2 | 3/2006 | Carmichael et al. | |
| 7,014,464 B2 | 3/2006 | Niznick | |
| 7,108,510 B2 | 9/2006 | Niznick | |
| 7,198,488 B2 | 4/2007 | Lang et al. | |
| 7,207,800 B1 | 4/2007 | Kwan | |
| 7,210,933 B2 | 5/2007 | Haessler | |
| 7,249,949 B2 | 7/2007 | Carter | |
| 7,273,373 B2 | 9/2007 | Horiuchi | |
| 7,281,925 B2 | 10/2007 | Hall | |
| 7,300,283 B2 | 11/2007 | Aravena et al. | |
| 7,341,454 B2 | 3/2008 | Balfour et al. | |
| 7,377,781 B1 | 5/2008 | Karapetyan | |
| 7,383,163 B2 | 6/2008 | Holberg | |
| D605,767 S | 12/2009 | Lauryssen | |
| D612,498 S | 3/2010 | Johnson | |
| 7,677,891 B2 | 3/2010 | Niznick | |
| D616,096 S | 5/2010 | Lauryssen | |
| 7,806,693 B2 | 10/2010 | Hurson | |
| 8,016,594 B2 | 9/2011 | Ferris et al. | |
| 8,029,285 B2 | 10/2011 | Holmen et al. | |
| D648,436 S | 11/2011 | Stelter et al. | |
| 8,066,511 B2 | 11/2011 | Wohrle et al. | |
| 8,083,442 B2 | 12/2011 | Pan | |
| D653,758 S | 2/2012 | Stelter et al. | |
| D662,593 S | 6/2012 | Prosser et al. | |
| 8,192,199 B2 | 6/2012 | Arni | |
| 8,221,119 B1 | 7/2012 | Valen | |
| 8,277,218 B2 | 10/2012 | D'Alise | |
| 8,408,904 B2 | 4/2013 | Purga et al. | |
| 8,460,306 B2 * | 6/2013 | Schaffran | A61C 8/0089 |
| | | | 606/104 |
| 8,485,819 B2 | 7/2013 | Callan | |
| 8,491,302 B2 | 7/2013 | Arni | |
| 8,714,977 B2 | 5/2014 | Fromovich et al. | |
| 8,758,012 B2 | 6/2014 | Hurson | |
| 8,764,443 B2 | 7/2014 | Hall | |
| 8,858,230 B2 | 10/2014 | Hsieh | |
| 8,870,573 B2 | 10/2014 | Hung | |
| 8,888,486 B2 | 11/2014 | Goodman et al. | |
| 9,220,582 B2 | 12/2015 | Thome et al. | |
| 9,522,051 B2 * | 12/2016 | Engman | A61C 8/0068 |
| 9,681,930 B2 | 6/2017 | Thome et al. | |
| 9,855,117 B2 | 1/2018 | Hwang | |
| 10,470,851 B2 * | 11/2019 | Courvoisier | A61C 8/0048 |
| 2001/0000748 A1 | 5/2001 | Rogers et al. | |
| 2002/0064758 A1 | 5/2002 | Lee | |
| 2002/0102518 A1 | 8/2002 | Mena | |
| 2002/0106612 A1 | 8/2002 | Back et al. | |
| 2002/0177106 A1 | 11/2002 | May et al. | |
| 2003/0064349 A1 | 4/2003 | Simmons | |
| 2003/0124487 A1 | 7/2003 | McDevitt | |
| 2004/0006346 A1 | 1/2004 | Holmen et al. | |
| 2004/0033469 A1 | 2/2004 | Blacklock | |
| 2004/0063069 A1 | 4/2004 | Lombardi | |
| 2004/0063071 A1 | 4/2004 | Schroering | |
| 2004/0101808 A1 | 5/2004 | Porter et al. | |
| 2005/0053897 A1 | 3/2005 | Wu | |
| 2005/0100863 A1 | 5/2005 | Chang | |
| 2005/0214714 A1 | 9/2005 | Wohrle | |
| 2005/0244789 A1 | 11/2005 | Crohin et al. | |
| 2005/0260540 A1 | 11/2005 | Hall | |
| 2005/0266381 A1 | 12/2005 | Abarno | |
| 2005/0287497 A1 | 12/2005 | Carter | |
| 2006/0003290 A1 | 1/2006 | Niznick | |
| 2006/0078847 A1 | 4/2006 | Kwan | |
| 2006/0099153 A1 | 5/2006 | Kato et al. | |
| 2006/0147880 A1 | 7/2006 | Krumsiek et al. | |
| 2006/0172257 A1 | 8/2006 | Niznick | |
| 2006/0172258 A1 | 8/2006 | Niznick | |
| 2006/0183078 A1 | 8/2006 | Niznick | |
| 2006/0223030 A1 | 10/2006 | Dinkelacker | |
| 2007/0065778 A1 | 3/2007 | Lippe | |
| 2007/0072148 A1 | 3/2007 | Memmolo et al. | |
| 2007/0287128 A1 | 12/2007 | Claudio et al. | |
| 2008/0014556 A1 | 1/2008 | Neumeyer | |
| 2008/0032264 A1 | 2/2008 | Hall | |
| 2008/0182227 A1 | 7/2008 | Wolf et al. | |
| 2008/0187886 A1 | 8/2008 | Robb | |
| 2008/0293014 A1 | 11/2008 | Chung | |
| 2009/0220914 A1 | 9/2009 | Gershenzon | |
| 2009/0233256 A1 | 9/2009 | Schroering | |
| 2009/0305191 A1 | 12/2009 | Jandali | |
| 2010/0092920 A1 | 4/2010 | Hsieh | |
| 2010/0190138 A1 | 7/2010 | Giorno | |
| 2010/0248181 A1 | 9/2010 | Kremer et al. | |
| 2011/0027756 A1 | 2/2011 | Benatouil et al. | |
| 2011/0097689 A1 | 4/2011 | Thome | |
| 2011/0117522 A1 | 5/2011 | Verma et al. | |
| 2011/0123953 A1 | 5/2011 | Jorneus et al. | |
| 2011/0143317 A1 | 6/2011 | Thome | |
| 2011/0195380 A1 | 8/2011 | Giorno | |
| 2011/0244427 A1 | 10/2011 | Hung | |
| 2011/0294094 A1 | 12/2011 | Moshavi | |
| 2012/0077151 A1 | 3/2012 | Nary Filho et al. | |
| 2012/0135378 A1 | 5/2012 | Thome | |
| 2012/0156647 A1 | 6/2012 | Yoon et al. | |
| 2012/0178048 A1 | 7/2012 | Cottrell | |
| 2012/0237898 A1 | 9/2012 | Palti et al. | |
| 2012/0237899 A1 | 9/2012 | Holmstrom et al. | |
| 2012/0237900 A1 | 9/2012 | Lancieux et al. | |
| 2012/0288824 A1 | 11/2012 | Nordin et al. | |
| 2013/0045144 A1 | 2/2013 | Perozziello et al. | |
| 2013/0177874 A1 | 7/2013 | Hori et al. | |
| 2013/0224687 A1 | 8/2013 | Karmon | |
| 2013/0244202 A1 | 9/2013 | Chen | |
| 2013/0260339 A1 | 10/2013 | Reddy et al. | |
| 2013/0273500 A1 | 10/2013 | Giorno | |
| 2013/0309630 A1 | 11/2013 | Bolleter | |
| 2014/0045144 A1 | 2/2014 | Dukhan | |
| 2014/0186799 A1 | 7/2014 | Pan et al. | |
| 2014/0234800 A1 | 8/2014 | Laster | |
| 2015/0044638 A1 | 2/2015 | Baez | |
| 2015/0111175 A1 | 4/2015 | Thome et al. | |
| 2015/0230889 A1 | 8/2015 | Kim | |
| 2015/0297321 A1 | 10/2015 | Chen | |
| 2016/0166358 A1 | 6/2016 | Thome et al. | |
| 2017/0071702 A1 | 3/2017 | Fromovich | |

FOREIGN PATENT DOCUMENTS

| | | |
|---|---|---|
| BR | PI0902500 A2 | 4/2011 |
| CN | 203029412 | 7/2013 |
| DE | 39 04 528 | 8/1990 |
| DE | 10231743 | 2/2004 |
| DE | 1 728 486 | 12/2006 |
| EP | 0 707 835 A1 | 4/1996 |
| EP | 0 819 410 A1 | 1/1998 |
| EP | 0 895 757 A1 | 2/1999 |
| EP | 1 396 236 | 3/2004 |
| EP | 2 145 600 A1 | 1/2010 |
| FR | 2600246 A1 | 12/1987 |

(56) References Cited

FOREIGN PATENT DOCUMENTS

| | | |
|---|---|---|
| FR | 2610512 | 8/1988 |
| RU | 2190373 | 10/2002 |
| RU | 2202982 | 4/2003 |
| WO | WO-01/49199 A1 | 7/2001 |
| WO | WO-03/005928 A1 | 1/2003 |
| WO | WO-2006/026938 A1 | 3/2006 |
| WO | WO-2006/082050 A1 | 8/2006 |
| WO | WO-2007/091997 A1 | 8/2007 |
| WO | WO-2008/096294 A1 | 8/2008 |
| WO | WO-2008/157137 A1 | 12/2008 |
| WO | WO-2009/007891 A1 | 1/2009 |
| WO | WO-2009/054005 A1 | 4/2009 |
| WO | WO-2009/130415 A1 | 10/2009 |
| WO | WO-2011/083400 A1 | 7/2011 |
| WO | WO-2011/132007 A1 | 10/2011 |
| WO | WO-2012/007118 A1 | 1/2012 |
| WO | WO-2012/059908 A1 | 5/2012 |
| WO | WO-2012/075614 A1 | 6/2012 |
| WO | WO-2012/123661 A1 | 9/2012 |
| WO | WO-2012/126466 A1 | 9/2012 |
| WO | WO-2013/004703 A1 | 1/2013 |
| WO | WO-2013/068088 A1 | 5/2013 |
| WO | WO-2013/157756 A1 | 10/2013 |
| WO | WO-2016/094997 A1 | 6/2016 |

OTHER PUBLICATIONS

AlphaBio Product Catalog, 16 pages (1995).
AlphaBio System Product Catalog, 53 pages, Mar. 2003.
Anthogyr Implants Sas Catalog, The Implantology Serenly, 40 pages (2002).
Bicon Dental Implants Catalog, 7 pages (1997).
Hansson, The Implant Neck: Smooth or Provided With Retention Elements, A Biomechanical Approach, Clin. Oral Impl. Res, 10:394-405 (1999).
Instradent Catalog—"Facility Implants—The Solution for Narrow Restorative Spaces", 4 pages (2014).
Instradent Catalog—"Neodent—20 Years of Advancement in Implantology", 8 pages (2013).
Instradent Catalog—"One Step Hybrid—The Definitive Solution for The Immediate Loading of a Full Arch Prosthesis", 8 pages (2014).
Instradent Catalog—"The CM Implant Line", 8 pages (2013).
Instradent Catalog—"The CM Implant Line—Overview", 2 pages (2013).
Instradent Catalog—"The Smart Implant Line—External Hex—Overview", 2 pages (2013).
Instradent Catalog—"The Smart Implant Line—External Hex, A Classic in Versatility", 8 pages (2013).
Instradent Catalog—"The WS Implant Line—Overview", 2 pages (2013).
International Search Report & Written Opinion dated Jan. 8, 2016 in Int'l PCT Patent Application Serial No. PCT/BR2015/050240.
Judy, et al., Improved Technique of endodontic stabilization—biofunctional considerations, Oral Health, vol. 65, No. 4, pp. 36-44 (1975).
Ledermann, et al., Long-Lasting Osseointegration of Immediately Loaded, Bar-Connected TPS Screws After 12 Years of Function: A Histologic Case Report of a 95-year-old Patient, The International Journal of Periodontics & Restorative Dentistry, 18(6):553-563 (1998).
Ledermann, et al., Titanium-Coated Screw Implants as Alloplastic Endosteal Retention Element in the Edentulous Problematic Mandible (I), Systematic Procedure to the Time of Impression-Taking, Color Atlas, Quintessence International, pp. 895-901 (1981).
M Implant—Double Morse Taper Connection, http://en.tbr-implants.com/home/products/implants/implant-m, 3 pages, Sep. 2014.
Spiekermann, et al., Color Atlas of Dental Medicine, Implantology, Ledermann Screw Implant, p. 52, (1995).
SwissPlus Implant System—Product Catalog, "Centerpulse", 28 pp. (2003).
Tapered SwissPlus Self-Tapping Design & Double Lead Threads, Zimmer Dental, http://www.zimmerdental.com/products/implants/im_tswpFSelfTap.aspx, 1 page, (2014).
Weiss, Charles M., DDS, Principles and Practice of Implant Dentistry, Chapter 19—Endodontic Stabilizer Implants-Tooth Root Extension for Improved Prognosis, 17 pages (2001).
U.S. Appl. No. 29/643,032, filed Apr. 3, 2018, Thome, Geninho.
U.S. Appl. No. 29/643,035, filed Apr. 3, 2018, Thome, Geninho.
U.S. Appl. No. 29/643,036, filed Apr. 3, 2018, Thome, Geninho.
International Search Report and Written Opinion dated Jun. 27, 2017 in Int'l PCT Patent Application Serial No. PCT/BR2017/050101 (With English Translation of Search Report)ghj,.
U.S. Appl. No. 29/530,135 / U.S. Pat. No. D816,841, filed Jun. 12, 2015 / May 1, 2018.
U.S. Appl. No. 29/643,035, filed Apr. 3, 2018.
U.S. Appl. No. 29/643,032, filed Apr. 3, 2018.
U.S. Appl. No. 29/643,036, filed Apr. 3, 2018.
U.S. Appl. No. 14/874,145 / U.S. Pat. No. 9,681,930, filed Oct. 2, 2015 / Jun. 20, 2017.
U.S. Appl. No. 15/624,261, filed Jun. 15, 2017.

* cited by examiner

PROSTHETIC ASSEMBLY AND METHOD FOR PRODUCING THE SAME

CROSS-REFERENCE TO RELATED APPLICATIONS

This application is a national phase of International PCT Patent Application No. PCT/BR2017/050101, filed Apr. 28, 2017, which claims priority to Brazilian Patent Application No. BR 102016010184-0, filed May 5, 2016, the entire contents of each of which are incorporated herein by reference.

FIELD OF THE INVENTION

The invention belongs to the field of prosthetic restoration for use in the human body and is related, in particular, to a prosthetic assembly designed to aid in removal of a prosthesis after used by a subject, as well as a process for production thereof.

BACKGROUND OF THE INVENTION

Prosthetic restorations for dental and orthopedic use are widely known in the state of the art, and are comprised of different components attached to each other, these components are usually joined together by a retention screw and/or a fitting geometry that stops relative motion between the parts.

For instance, in an implant-supported dental restoration, one or more implants may be inserted into a subject's jaw, so that it can receive structural elements in the form of prosthetics abutments, preceding aesthetic elements as crowns or bridges. In this configuration, the implant is attached to the bone by its geometry as well as adhesion or "osseointegration" of the implant surface to the bone. The structural element is then mounted on the implant and attached by the retention screw.

During treatment or periodic maintenance, it may be necessary to remove or "pop out" the structural element of the implant, which would require that the dental health practitioner exerts force to remove the element. However, due to the effects of cyclic compression on the components, caused by chewing, these can adhere to each other, making it harder for them to be removed, thus causing discomfort or even injury to the subject.

The issue of torque increase in removal of prosthesis abutment screw after mechanical cycling is extensively known in the state of the art. Decreasing the installation torque on the screw is not an option, as it is known that mechanical stability of the implant-connection assembly is required for the implant restoration to be successful. The remaining issue regards increasing the removal torque of prosthetic components, especially those including Morse cone, which can lead to fracture of the tool in use, or fracture of the component, if employed excessively.

Current state of the art only includes systems for locking prosthetic elements comprising different combinations of retention screws and fitting geometry. However, geometries that might make removal of the prosthetic element easier by exerting a force in the pop-out direction of the component are not known.

By way of example, U.S. Pat. No. 6,663,388 discloses an interconnection between a known dental implant and a prosthetic element (i.e. a straight or angular connection). Said interconnection is attached to the implant by means of a screw and support ring, only receiving the prosthetic component as a secondary element, which is attached to the interconnection by means of a second screw. It can be verified that the support ring containing the interconnection screw is attached to the lower part of the interconnection, subsequent to insertion of the screw through the lower part of the interconnection as well. However, the described ring does not make the removal process of the prosthetic component any easier, as it is fixed by the second screw of the assembly, which has to be removed prior to removal of the prosthetic element, as in the prior art.

U.S. Pat. No. 4,927,363 discloses a compression ring seated upon the shoulder of a prosthetic component, between a threaded portion and a centering pin of the screw. Such ring works to improve the seal between the components, but also fails to aid in removal of the prosthetic component that has been subjected to torque from repeated operation cycles. Other examples of screws comprising rings can be found, such as in U.S. Pat. No. 5,100,323 and U.S. Pat. No. 8,888,486, which solve different issues, but are not effective in aiding the removal of the prosthetic component that is sealed against the body of the implant after repeated cycles.

The present invention discloses a solution for the issues of prosthetic component shearing, increasing of removal torque due to cycling, tools breaking, and jamming of temporary posts and abutments. The invention defines a prosthetic assembly which can be of different types, such as posts, mini abutments and connectors of the UCLA type after cementing, designed to aid in removal of the prosthetic element, whenever necessary.

SUMMARY

The present invention defines a prosthetic assembly, comprising prosthetic component and retention screw, the assembly further comprising an interference geometry or element designed to allow relative rotation, limit relative longitudinal motion and inseparably join the prosthetic component and the retention screw.

The interference geometry may be in the form of a ring attached to the retention screw in a portion of the body of the screw having a smaller diameter, or in the form of one or more inwardly folded flaps, integrated to the prosthetic component and diametrically distributed around the base thereof, or in the form of a uniform, tapered and hollow projection of the lower portion of the prosthetic element.

The prosthetic component may be of various types, including: connection, straight abutment, angled abutment, mini conical abutment, UCLAs, analogues, "transfers", straight post and angled post. It also comprises a lower portion, of any form, but preferably in the form of a Morse cone (also known in the art as 'Morse taper'), as well as an anti-rotation geometry, of any form, but preferably in the form of a hexagonal or octagonal prism.

The invention further defines a process for the production of the prosthetic component presented herein, including the steps of forming a prosthetic component having a central hole for receiving the retention screw, forming a retention screw, the body of which has a portion having a smaller diameter, inserting said retention screw into the central hole of the prosthetic component, and forming an interference geometry, between the base of the prosthetic component and the body of the retention screw.

The processes for production of the prosthetic assemblies according to the preferred embodiments of the invention differ as to the manner of forming the interference element. Wherein: in the first preferred embodiment, the step of forming an interference geometry comprises attaching a ring to the portion of the body of the screw having a smaller diameter; in the second preferred embodiment, the step of forming an interference geometry comprises inwardly folding one or more integrated flaps to, and distributed in the prosthetic element base, said one or more flaps inwardly folded into, and so as to cooperate with, the portion of the body of the retention screw having a smaller diameter; and, in the third preferred embodiment, the step of forming an interference geometry comprises inwardly folding a hollow projection of the prosthetic element lower portion, forming thereby a tapered element which cooperates with the portion of the retention screw having a smaller diameter.

BRIEF DESCRIPTION OF THE DRAWINGS

The invention will now be described in reference to the accompanying figures, by way of non-limiting example, wherein.

Further.

Similarly.

DETAILED DESCRIPTION OF THE INVENTION

Figure 1A:
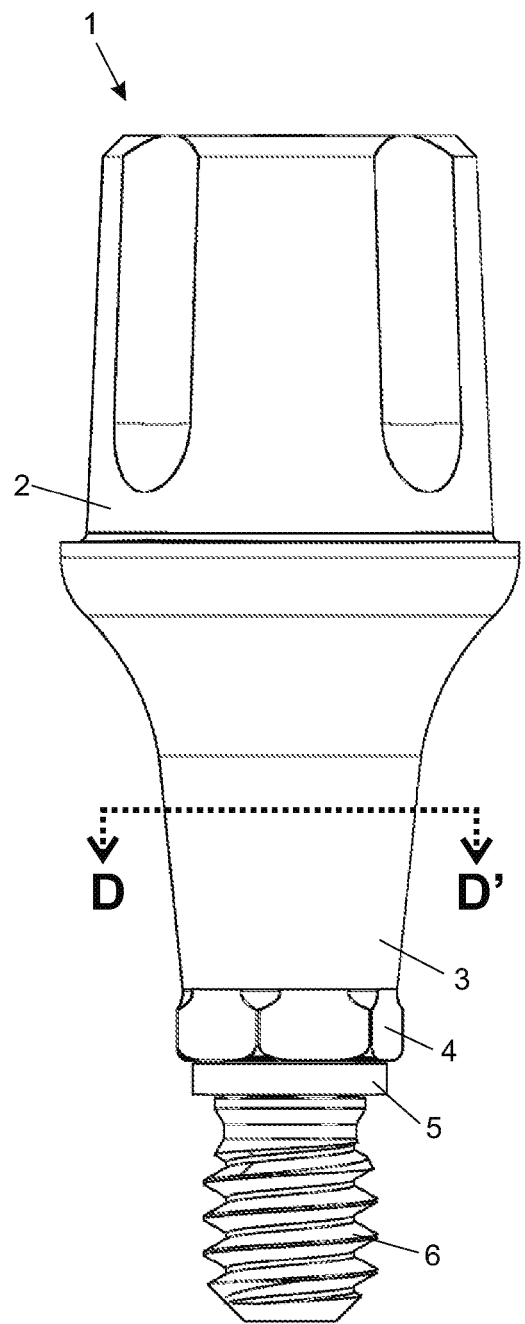
FIG. 1A is a side view of a first embodiment of the prosthetic assembly which is the object of the present invention.

Throughout this description, similar reference signs in the drawings indicate features having similar functions. Moreover, when references are made to, for instance, an interference 'element' or 'geometry', in similar contexts, it must be understood that both refer to the same feature, which can be implemented as an external 'element' associated to the assembly, or a 'geometry' integrated into the body of one of the parts of the assembly.

Regarding FIG. 1A, the first embodiment of the prosthetic assembly 1, which is the object of the present invention, comprises a prosthetic component 2, having a lower portion 3, an anti-rotation geometry 4, an interference element or geometry 5 and a retention screw 6, inserted into a central hole 8 of the prosthetic component 2. The central hole 8 can be better observed in FIG. 1B.

The prosthetic component 2 shown is a prosthetic post, but it could likewise be any other type of prosthetic element known in the art, such as: connection, straight abutment, angled abutment, mini conical abutment, UCLAs, analogues, "transfers", straight post and angled post etc. Further, lower portion 3 of the prosthetic element 2 is illustrated in the form of a Morse cone (also known in the art as 'Morse taper'), but it could likewise be any other type of flat or curved surface.

When installed in a dental implant 7 (see FIGS. 4A-5C), the lower portion 3 of the prosthetic component 2 contacts the corresponding inner wall of the implant 7, forming a uniform seal throughout the periphery of the prosthetic component, in order to increase its resistance to lateral forces. Similarly, the anti-rotational geometry 4 contacts the corresponding geometry within the implant 7, so as to prevent relative movement of rotation between the two components. It should be noted that, although shown in hexagonal form, the anti-rotational geometry 4 may be of any geometry known in the art, capable of preventing relative rotation between the pieces, for example, a triangular or octagonal prism, a cylinder with square keys, or any amorphous geometry.

In use, for example during chewing, the prosthetic assembly 1 is cyclically compressed against the implant 7 where it is installed. With each compression cycle, micro-deformations in the components or even gradual compression on the seal between the lower portion 3 of the prosthetic component 2 and the corresponding inner wall of the implant 7 causes them to adhere to each other, so that a dental health practitioner will have great difficulty in separating them without damaging the components or injuring the patient. To remedy this problem, the prosthetic assembly of the present invention comprises an interference element or geometry 5, which, on the one hand, allows relative rotation between the prosthetic component 2 and the retention screw 6, and, on the other hand, limits the longitudinal motion therebetween so that, when the screw 6 receives a removal torque, the interference element or geometry 5 eventually bumps into the lower edge of the prosthetic component 2, converting and transmitting part of the removal torque which is applied to the screw 6, into a force in the removal direction of the prosthetic component 2.

Figure 1B:
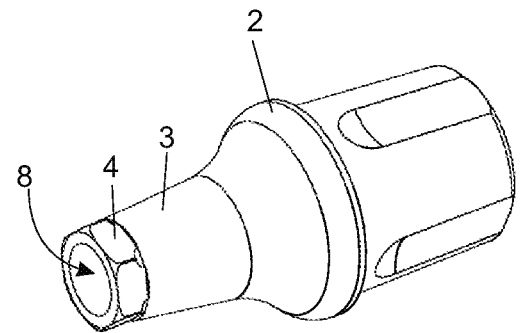
FIG. 1B is a perspective view of the prosthetic component that integrates the prosthetic assembly of the first embodiment of the invention.
Figure 1C:
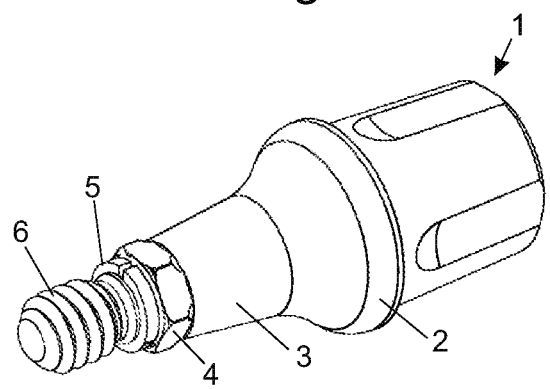
FIG. 1C is a perspective view of the prosthetic assembly shown in FIG. 1A.
Figure 1D:
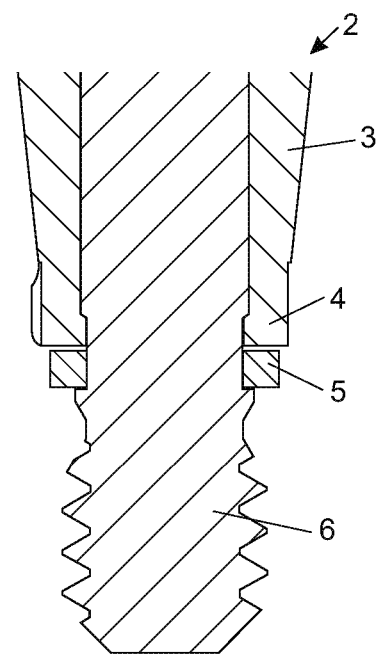
FIG. 1D is a cross-sectional view of the lower portion of FIG. 1A from line DD', showing the internal assembly of the first embodiment of the prosthetic assembly which is the object of the present invention.
Figure 2A:
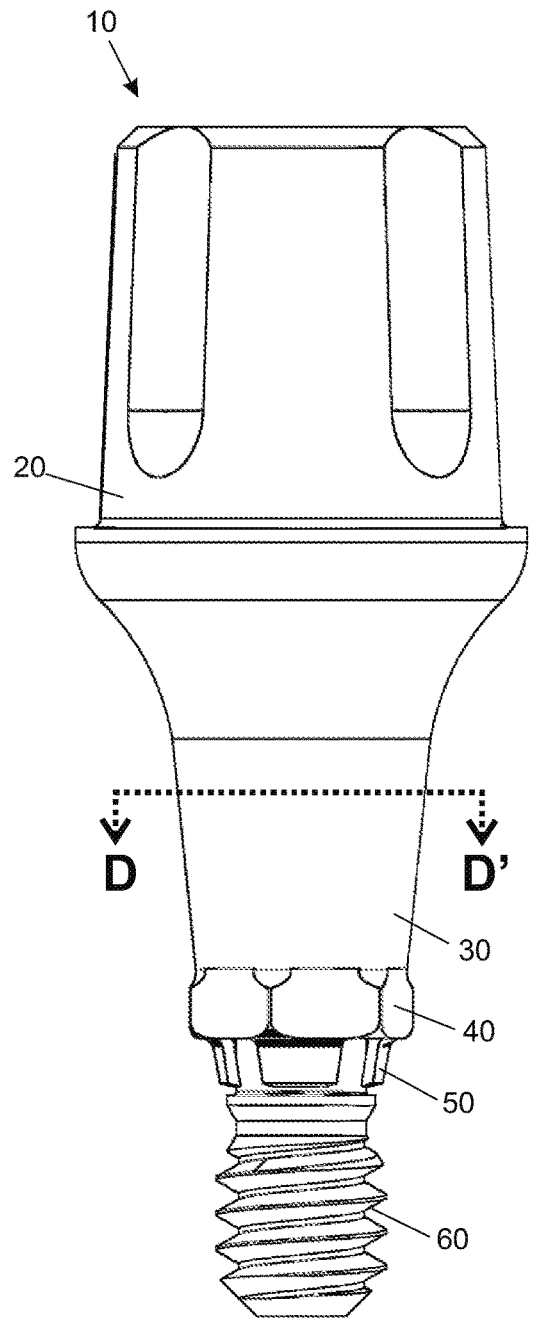
FIG. 2A, in turn, is a side view of a second embodiment of the prosthetic assembly which is the object of the present invention.
Figure 2B:
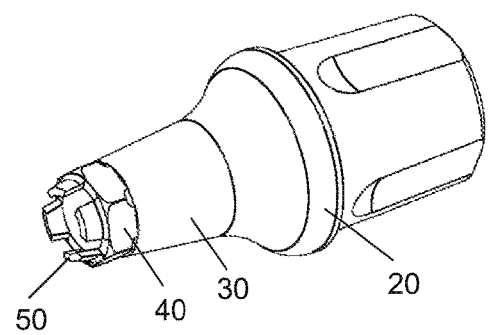
FIG. 2B is a perspective view of the prosthetic component that integrates the prosthetic assembly of the second embodiment of the invention.
Figure 2C:
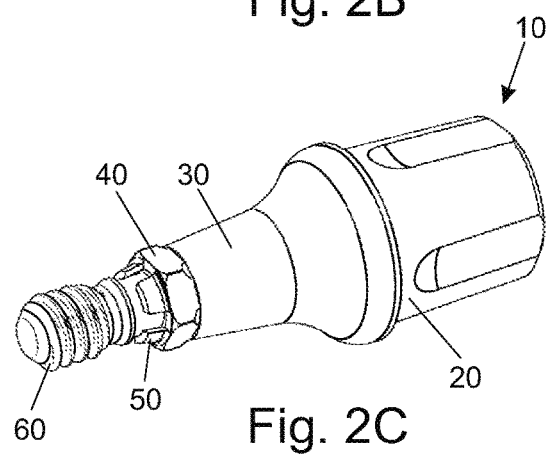
FIG. 2C is a perspective view of the prosthetic assembly shown in FIG. 2A.
Figure 2D:
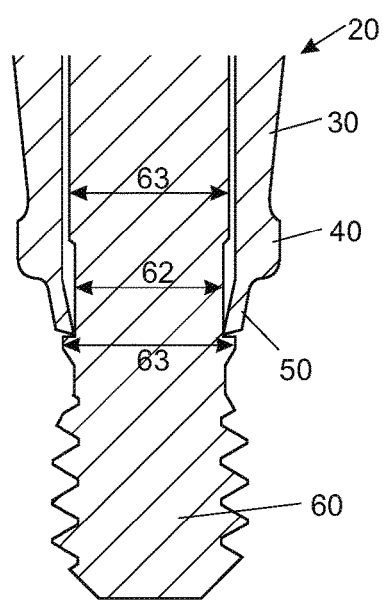
FIG. 2D is a cross-sectional view of the lower portion of FIG. 2A from line DD', showing the internal assembly of the second embodiment of the prosthetic assembly which is the object of the present invention.
Figure 3A:
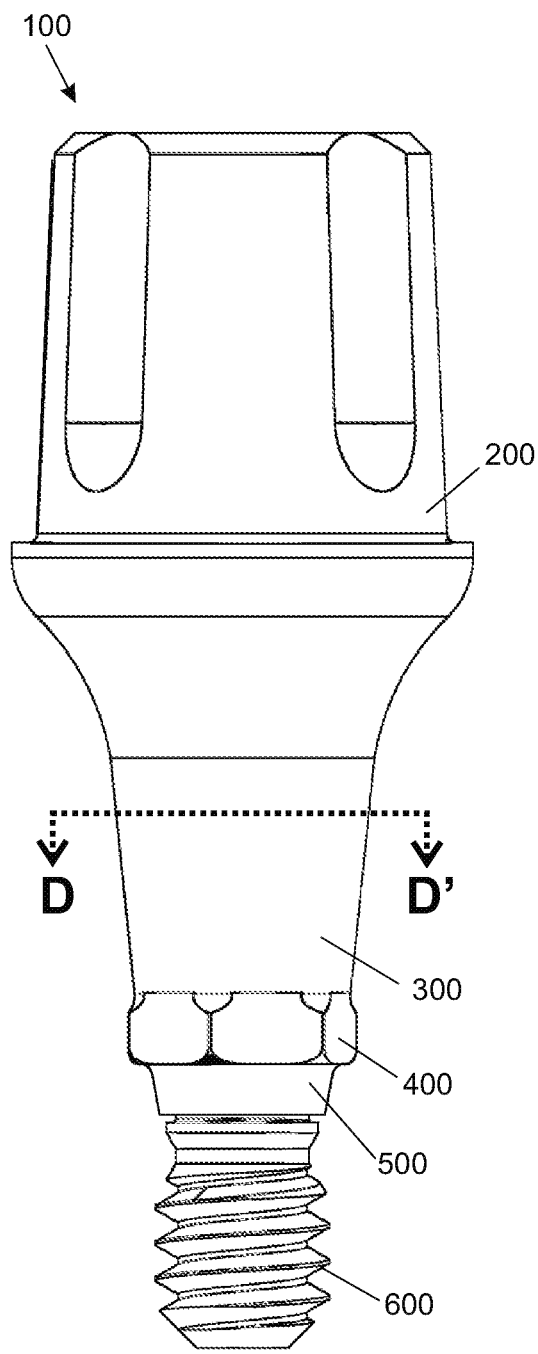
FIG. 3A is a side view of a third embodiment of the prosthetic assembly which is the object of the present invention.
Figure 3B:
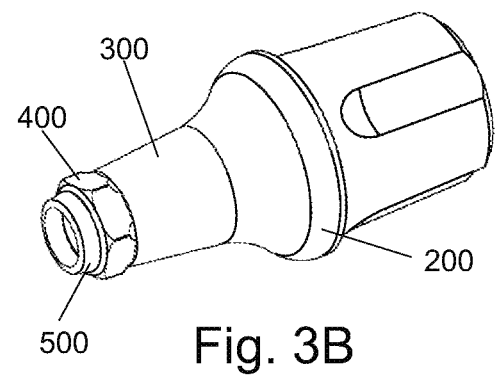
FIG. 3B is a perspective view of the prosthetic component that integrates the prosthetic assembly of the third embodiment of the invention.
Figure 3C:
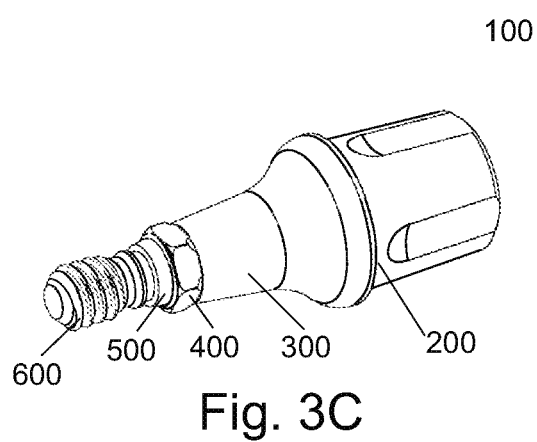
FIG. 3C is a perspective view of the prosthetic assembly shown in FIG. 3A.
Figure 3D:
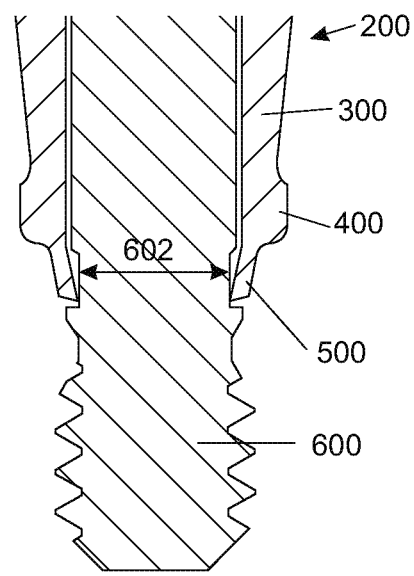
FIG. 3D is a cross-sectional view of the lower portion of FIG. 3A from line DD', showing the internal assembly of the third embodiment of the prosthetic assembly object of the present invention.

For better understanding the parts of the prosthetic component 1, FIG. 1B shows only the prosthetic component 2 which integrates the prosthetic assembly of the first embodiment of the invention. In turn, FIGS. 1C and 1D show the complete assembly 1, in perspective and cutaway views from the line DD' of FIG. 1A, respectively.

In this first embodiment, the interference member 5 comprises a ring having an outer diameter greater than the inner diameter of the access hole 8 of the screw 6 within the prosthetic component 2. The ring is installed in a portion of the body of the retention screw 6, the diameter of which is lowered relative to the rest of the screw body, so that said ring is installed and has its movement restricted to the body portion of the lowered diameter screw. Thus, when the screw 6 receives a removal torque, the ring composing the interference member 5 eventually abuts the lower portion of the prosthetic component 2, at which point it transmits part of the removal torque to the component 2, in the form of a force in the direction of component pop-out.

These relation between diameters of the screw body 6 and interference member 5 will be seen in more detail below in the description of the other embodiments of the invention.

Referring now to FIGS. 2A to 2D, the interference geometry 50 may form part of the prosthetic element 20, and doesn't need to be a separate element as is the case of the element 5 used in the first embodiment. The prosthetic assembly 10 of this second embodiment of the invention comprises only two parts: the prosthetic component 20 and the retention screw 60. As in the first embodiment, the prosthetic component 20 comprises a lower portion 30 and an anti-rotation geometry 40 which cooperates with corresponding surfaces within the implant. The interference geometry 50 is implemented in the form of one or more flaps of variable size, preferably four diametrically distributed flaps, folded inwardly at the base of the prosthetic component 20. In this case, as in the following embodiments, upon insertion of the screw, the flaps are mechanically folded or deformed inwardly to secure the screw in its portion having a smaller diameter. Said one or more flaps being inwardly folded into the smaller diameter portion 62 of the retention screw body 60, after insertion of said screw into the prosthetic component 20 to form the prosthetic assembly 10. The inner end diameter of the folded flap 52 (see FIG. 6B) being compatible with the smaller diameter 62 of the screw body, so as to allow relative rotation between these parts. However, the inner end diameter of the folded flap 52 being smaller than the larger diameter 63 of the screw body 60, so as to limit the relative longitudinal movement between these pieces.

FIGS. 3A to 3D illustrate a third embodiment of the invention, wherein the interference geometry 500 comprises a tapered and hollow uniform projection of the lower portion of the prosthetic element 200. As in the second embodiment, the prosthetic assembly 100 comprises only two parts: the prosthetic component 200 and the retention screw 600. The prosthetic component 200 comprises a lower portion 300 and an anti-rotation geometry 400 which cooperates with corresponding surfaces within the implant and, additionally, includes the interference geometry 500 in the form of a tapered and hollow uniform projection, which is folded inwardly after insertion of the retention screw 600 in an analogous manner to that of the second embodiment.

Figure 4A:
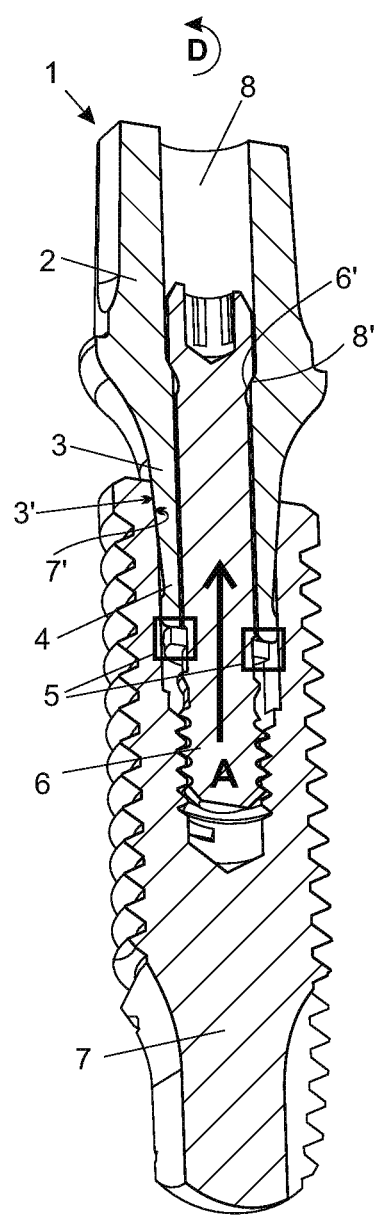
FIGS. 4A, 4B and 4C illustrate the gradual motion of the prosthetic assembly of the first embodiment, relative to a dental implant to which it has been attached, when the retention screw is driven in the direction of arrow D.
Figure 4B:
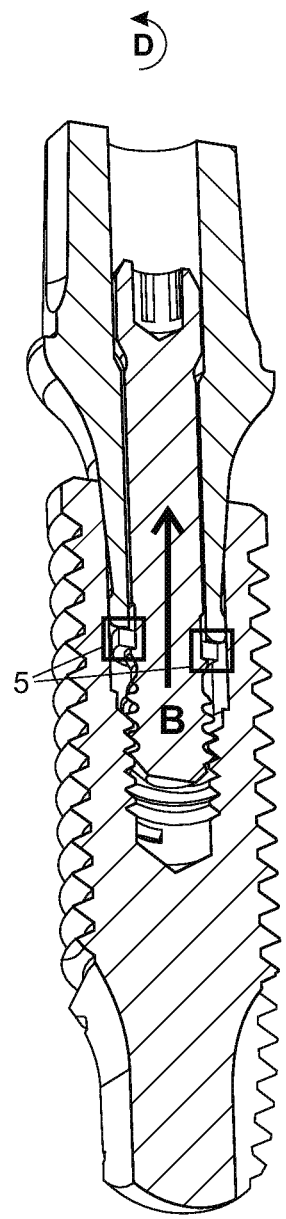
Figure 4C:
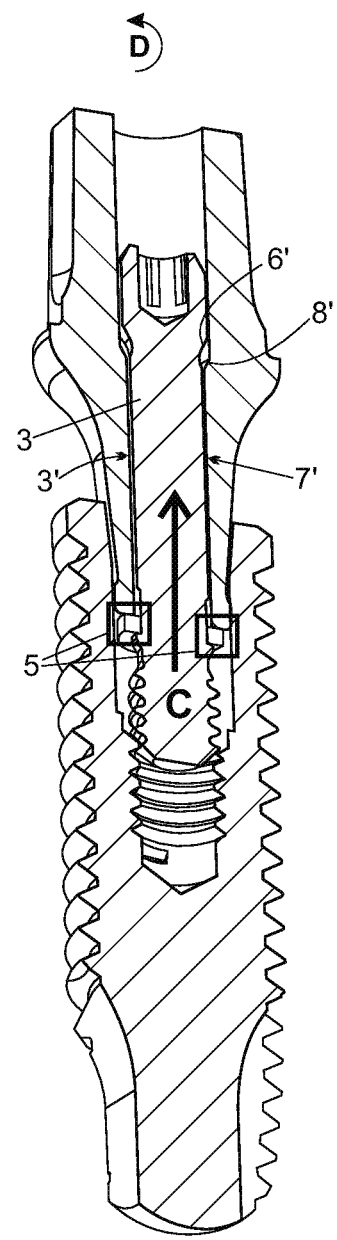

FIGS. 4A to 4C illustrate the gradual motion of the prosthetic assembly 1 of the first embodiment, relative to a dental implant 7 to which it has been attached, when the retention screw 6 is driven in the direction of the arrow D. The arrows A, B and C show the direction of motion of the screw 6 and prosthetic component 2 in the different stages. In stage A (FIG. 4A) the screw 6 is inserted into the implant 7 and the interference element 5 is not driven. In step B (FIG. 4B), when a removal torque is applied to the screw in the direction of the arrow D, the gradual return of the screw causes the interference member 5 to reach the permitted limit of longitudinal motion between screw 6 and prosthetic component 2. From this point, stage C (FIG. 4C), part of the removal torque that is applied to the screw 6 is transmitted to the prosthetic component as a force in the removal direction of the prosthetic component 2.

The cross-sectional view of FIGS. 4A-4C further illustrates the hole 8 disposed in the prosthetic component 2 for receiving the retention screw 6. The screw 6 has a first support surface 6' arranged to cooperate with the support surface 8' within the prosthetic component to prevent longitudinal motion of the component 2 when the screw 6 is engaged. When the support surface 6' of the screw cooperates with the surface 8' inside the prosthetic component 2 (FIG. 4A), the interference element 5 is within the permitted limit of movement and does not prevent the tightening of the screw. When the bolt is actuated in the removal direction (arrow D), the internal support surfaces of the screw 6' and component 8' move away from each other (FIG. 4B), up to the limit allowed by the interference element 5. At this limit (FIG. 4C), component 2 is forced in the removal direction shown in arrow C.

Inside the implant 7, the surface 3' of the lower portion 3 of the prosthetic component 2 cooperates with the corresponding surface 7' of the inner cavity of the implant. When the screw 6 is attached (FIG. 4A), the surface 3' of the lower portion 3 cooperates with the surface 7' of the implant cavity in order to seal the space therebetween. When the screw is driven in the removal direction (arrow D), the surface 3' of the lower portion 3 initially remains attached to the surface 7' of the implant cavity (FIG. 4B). In a second moment (FIG. 4C), the force acting in the removal direction of the prosthetic component 2 by the interference element 5 leads to the spacing between the two surfaces (the surface 3' of the lower portion 3 and the surface 7' of the implant cavity) without the need for any extra intervention by the dental health practitioner removing the component.

Figure 5A:
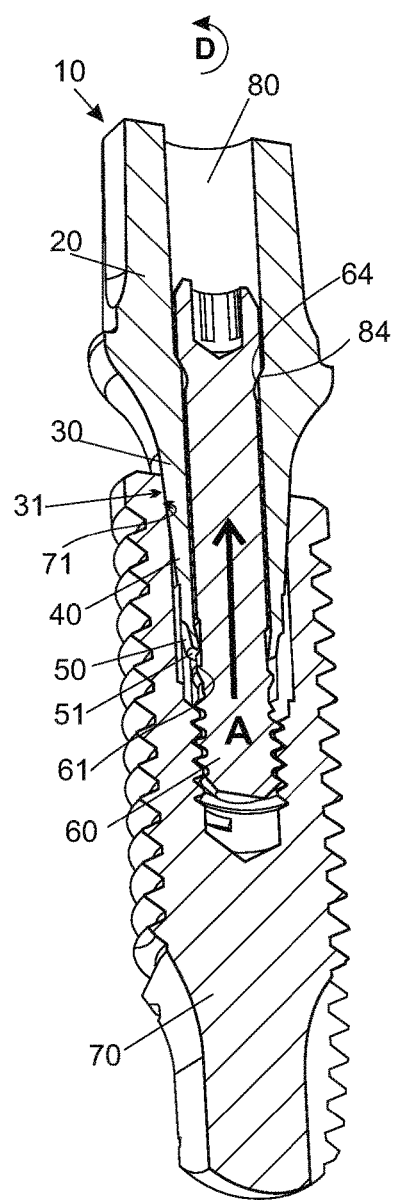
FIGS. 5A, 5B and 5C illustrate the gradual motion of the prosthetic assembly of the second embodiment, relative to a dental implant to which it has been attached, when the retention screw is driven in the direction of arrow D.
Figure 5B:
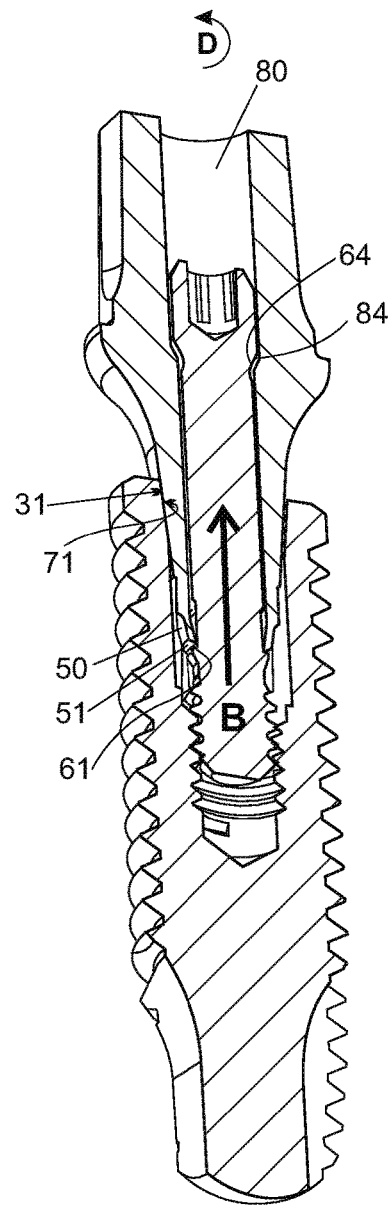
Figure 5C:
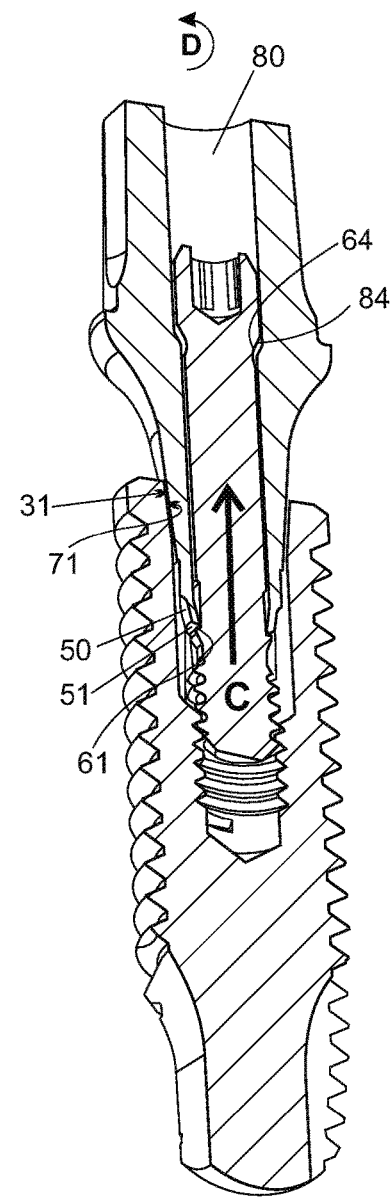

Similarly, FIGS. 5A, 5B and 5C illustrate the gradual motion of the prosthetic assembly of the second embodiment, relative to a dental implant to which it has been attached, when the retention screw is driven in the direction of the arrow D. In this second embodiment, it has an interference geometry 50 integral with the prosthetic component 20.

In an analogous manner to that of the description of FIGS. 4A to 4C, FIGS. 5A to 5C illustrate the gradual motion of the prosthetic assembly 10 relative to a dental implant 70 to which it has been attached, when the retention screw 60 is driven in the direction of arrow D. Arrows A, B and C show the motion direction of the screw 60 and prosthetic component 20 at different stages. In stage A (FIG. 5A) the screw 60 is inserted into the implant 70 and the interference member 50 is not driven. In stage B (FIG. 5B), when a removal torque is applied to the screw in the direction of the arrow D, the gradual return of the screw causes the interference member 50 to reach the permitted limit of longitudinal motion between screw 60 and prosthetic component 20. This limit occurs when the surface 61 of the smaller diameter portion 62 of the body of the retention screw 60 abuts the lower surface 51 of the interference member 50. From this point, stage C (FIG. 5C), part of the torque which is applied to the screw 60, is transmitted to the prosthetic component 20 as a force in the pop-out direction of the prosthetic component.

The cross-sectional views of FIGS. 5A-5C also illustrate the hole 80 disposed in the prosthetic component 20 for receiving the retention screw 60. The screw 60 has a first support surface 64 arranged to cooperate with the corresponding support surface 84 within the prosthetic component in order to prevent longitudinal motion of the component 20 when the screw 60 is secured. When the support surface 64 of the screw cooperates with the surface 84 within the prosthetic component 20 (FIG. 5A), the interference member 50 is within the permitted limit of movement and does not prevent the tightening of the screw. When the screw is driven in the removal direction (arrow D), the screw internal support surfaces 64 and component 84 move away from each other (FIG. 5B), up to the limit allowed by the interference member 50. At this limit (FIG. 5C) the component 20 is forced in the removal direction indicated by arrow C.

Inside the implant 70, the surface 31 of the lower portion 30 of the prosthetic component 20 cooperates with the corresponding surface 71 of the internal cavity of the implant. When the screw 60 is secured (FIG. 5A), the surface 31 of the lower portion 30 cooperates with the surface 71 of the implant cavity in order to seal the space therebetween. When the screw is driven in the removal direction (arrow D), initially (FIG. 5B) the surface 31 of the lower portion 30 remains secured to the surface 71 of the implant cavity. Subsequently (FIG. 5C), the force acting in the pop-out direction of the prosthetic component 20 by the interference member 50 leads to the spacing between the two surfaces (the surface 31 of the lower portion 30 and the surface 71 of the implant cavity) without the need for any extra intervention by the dental health practitioner removing the component.

The method of producing the different embodiments of the prosthetic assembly 1, 10, 100 proposed above comprises the following steps: (a) forming a prosthetic component 2, 20, 200 having a central hole 8, 80 for receiving the retention screw 6, 60, 600; (b) forming a retention screw 6, 60, 600, the body of which has a portion having a smaller diameter 62, 602; (c) inserting said retention screw 6, 60, 600 into said central hole 8, 80 of the prosthetic component 2, 20, 200; and (d) forming an interference geometry 5, 50, 500 between the base of the prosthetic component 2, 20, 200 and the body of the retention screw 6, 60, 600, which allows relative rotation, limits the relative longitudinal motion, and inseparably joins said prosthetic component 2, 20, 200 to said retention screw 6, 60, 600.

The production of the different embodiments of the invention differs from each other in the step (d) of forming interference element 5 or interference geometry 50, 500. In producing a prosthetic assembly 1 according to the first embodiment of the invention, step (d) of forming an interference geometry 5 comprises attaching a ring to the portion having a smaller diameter of the screw body 6.

Regarding the production of a prosthetic assembly 10 according to the second embodiment of the invention, step (d) of forming an interference geometry 50 comprises inwardly folding one or more integrated flaps to, and distributed in the base of, the prosthetic component 20, said one or more flaps inwardly folded in, and so as to cooperate with, the portion having a smaller diameter 62 of the body of the retention screw 60.

When producing a prosthetic assembly 100 according to the third embodiment of the invention, step (d) of forming an interference geometry 500 comprises inwardly folding a hollow projection of the lower portion of the prosthetic element 200, thereby forming a tapered element that cooperates with the portion having a smaller diameter 602 of the body of the retention screw 600.

Figure 6A:
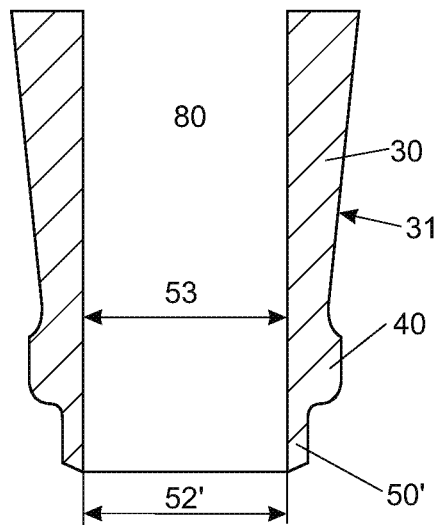
FIGS. 6A and 6B illustrate part of the production process of the prosthetic component lower edge of the second embodiment of the present invention.
Figure 6B:
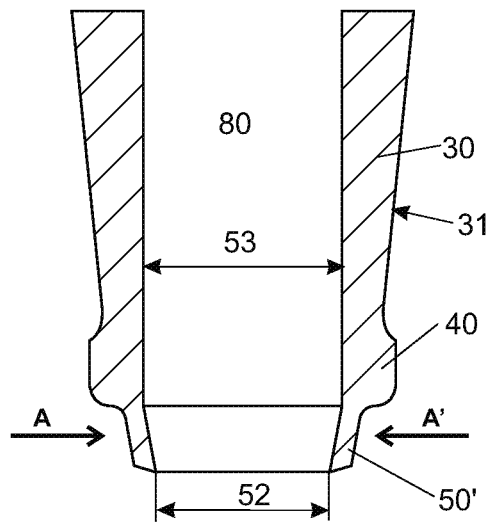

FIGS. 6A and 6B illustrate part of the lower edge manufacturing process of the prosthetic component of the second embodiment of the present invention. Initially, the inside diameter 53 of the hole 80 is equal to the mouth diameter 52' of the lower end 50' of the prosthetic component 20 prior to the formation of the interference member 50. In a second moment, a force in the direction of the arrows AA' diametrically into the hole 80 compresses the diameter of the mouth 52 of the hole 80 forming the interference member 50.

Figure 7A:
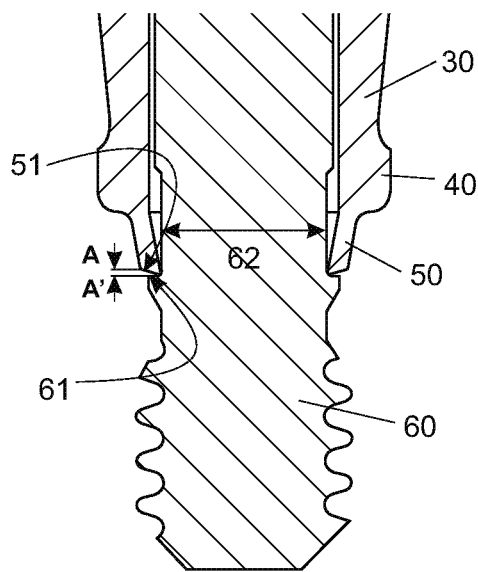
FIGS. 7A and 7B illustrate the motion of the retention screw within the limits imposed by the geometry of the prosthetic component lower edge of the second embodiment of the present invention.
Figure 7B:
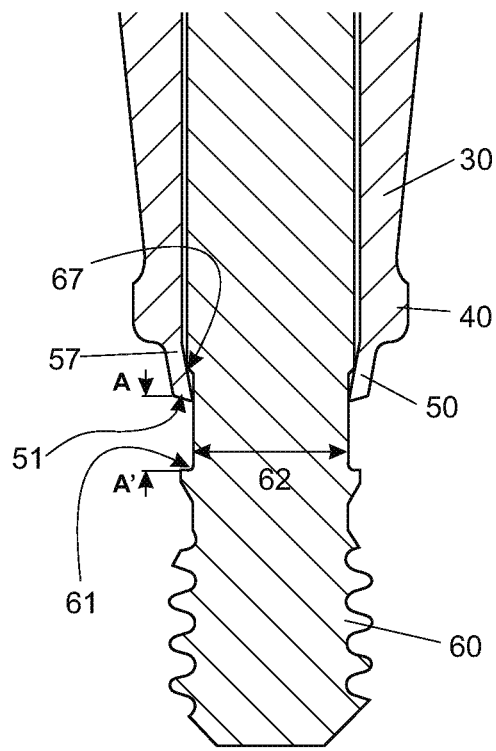

FIGS. 7A and 7B illustrate the motion of the retention screw 60 within the limits imposed by the geometry of the lower edge of the prosthetic component after formation of the interference member 50, when the screw moves in the direction indicated by the arrow C. Screw 60 is free to move between a minimum (indicated by line AA' in FIG. 7A) and maximum distance (indicated by line AA' in FIG. 7B). The minimum point being defined by the encounter of the surface 61 of the smaller diameter portion 62 of the body of the retention screw 60 with the lower surface 51 of the interference member 50. The maximum point being defined by the encounter of the opposing surface 67 of the smaller diameter portion 62 of the body of the retention screw 60 with the inner surface 57 of the interference member 50.

Although the invention has been described in terms of the preferred embodiments, it is clear that other forms could be adopted by those skilled in the art to obtain similar results. For example, arranging the interference geometry as a widening in the body of the retention screw 60 instead of the inward fold into the lower portion of the prosthetic component 20. The scope of the invention is therefore limited only by the following claims.

What is claimed:

1. A prosthetic assembly adapted to cooperate with a dental implant, the prosthetic assembly, comprising:
   a prosthetic component;
   a retention screw coupled to the prosthetic component so as to protrude from an end of the prosthetic component along a longitudinal axis, the retention screw comprising a body including a smaller diameter portion that has a smaller diameter than an adjacent portion of the body of the retention screw; and
   an interference geometry that comprises an end surface of the end of prosthetic component, and is designed to allow relative rotation and limit relative longitudinal motion of the prosthetic component and the retention screw, and inseparably join the prosthetic component and the retention screw,
   wherein:
      the interference geometry is configured to engage the smaller diameter portion of a body of the retention screw, and
      the smaller diameter portion of the body of the retention screw is delimited by a surface that is configured to abut against the end surface of the interference geometry when a removal torque is applied to the retention screw.

2. The prosthetic assembly of claim 1, wherein the interference geometry comprises one or more flaps integrated to the prosthetic component and diametrically distributed around a base thereof, the one or more flaps being inwardly folded in so as to engage the smaller diameter portion of the body of the retention screw.

3. The prosthetic assembly of claim 1, wherein the interference geometry comprises a uniform, tapered, and hollow projection on an end portion of the prosthetic component, the uniform, tapered, and hollow projection being inwardly folded in so as to engage the smaller diameter portion of the body of the retention screw.

4. The prosthetic assembly of claim 1, wherein the prosthetic component is selected from the group consisting of: a connection, straight abutment, angled abutment, mini conical abutment, UCLAs, analogues, transfers, straight post, and angled post.

5. The prosthetic assembly of claim 1, wherein the prosthetic component comprises a portion in a form of a Morse cone.

6. The prosthetic assembly of claim 1, wherein the prosthetic component comprises an anti-rotation geometry in a form of a hexagonal prism.

7. The prosthetic assembly of claim 1, wherein the prosthetic component comprises an anti-rotation geometry in a form of an octagonal prism.

8. A process for producing the prosthetic assembly of claim 1, the process comprising:
    forming the prosthetic component having a central hole for receiving the retention screw;
    forming the retention screw, a body of which includes a smaller diameter portion having a smaller diameter than an adjacent portion of the body of the retention screw;
    inserting the retention screw into the central hole of the prosthetic component; and
    forming the interference geometry between a base of the prosthetic component and the body of the retention screw, which is designed to allow relative rotation and limit relative longitudinal motion of the prosthetic component and the retention screw, and inseparably join the prosthetic component to the retention screw.

9. The process of claim 8, wherein the forming of the interference geometry comprises inwardly folding one or more flaps integrated to the prosthetic component, and distributed around the base of the prosthetic component, the one or more flaps being inwardly folded in so as to engage the smaller diameter portion of the body of the retention screw.

10. The process of claim 8, wherein the forming of the interference geometry comprises inwardly folding a hollow projection on an end portion of the prosthetic component, thereby forming a tapered element that engages the smaller diameter portion of the body of the retention screw.

11. The prosthetic assembly according to claim 1, wherein:
    the surface delimiting the smaller diameter portion has a larger diameter than the smaller diameter portion, and is a first boundary on a first axial side of the smaller diameter portion,
    the smaller diameter portion is further delimited by a second boundary on a second axial end side of the smaller diameter portion, and
    the second boundary has a larger diameter than the smaller diameter portion.

12. The prosthetic assembly according to claim 1, wherein the smaller diameter portion has a smallest diameter of the retention screw, and the interference geometry directly contacts the smaller diameter portion.

13. The prosthetic assembly according to claim 1, wherein the surface delimiting the smaller diameter portion has a larger diameter than an inner end diameter of the interference geometry.

14. A prosthetic assembly adapted to cooperate with a dental implant, the prosthetic assembly, comprising:
    a prosthetic component comprising a hole;
    a retention screw that extends along a longitudinal axis and is partially disposed in the hole of the prosthetic component so as to protrude from an end of the prosthetic component in an axial direction, the retention screw comprising a body including a smaller diameter portion that has a smaller diameter than first and second adjacent portions of the body of the retention screw, the first and second adjacent portions being formed on opposite axial end sides of the smaller diameter portion, and having larger diameters than the smaller diameter portion; and
    an interference geometry that is disposed at the end of the prosthetic component and includes an axial end surface facing away from the prosthetic component in a direction towards the first adjacent portion of the body of the retention screw, the interference geometry being configured to inseparably join the prosthetic component and the retention screw, while allowing relative rotation and limiting relative longitudinal motion of the prosthetic component and the retention screw;
    wherein:
        the interference geometry is configured to engage the smaller diameter portion of a body of the retention screw, and
        a surface of the first adjacent portion is configured to abut against the axial end surface of the interference geometry when a removal torque is applied to the retention screw.

15. The prosthetic assembly according to claim 14, wherein the interference geometry comprises a ring attached to the smaller diameter portion of the retention screw.

16. The prosthetic assembly according to claim 14, wherein the end of the prosthetic component forms the interference geometry.

17. The prosthetic assembly according to claim 14, wherein the first adjacent portion is spaced in the axial direction from a threaded portion formed on the retention screw.

18. The prosthetic assembly according to claim 14, wherein the smaller diameter portion has a smallest diameter of the retention screw, and the interference geometry directly contacts the smaller diameter portion.

* * * * *